United States Patent [19]

Browning

[11] 3,860,906
[45] Jan. 14, 1975

[54] SELF-PROPELLED DIRECTION MARKER

[76] Inventor: Malcolm Henry Browning, Park Farm Little Someborne, Stockbridge, England

[22] Filed: Sept. 12, 1973

[21] Appl. No.: 396,430

[30] Foreign Application Priority Data
Sept. 12, 1972 Great Britain.................... 42367/72

[52] U.S. Cl............. 340/135, 46/244 D, 180/65 R, 318/16, 343/225
[51] Int. Cl............................................. B60q 1/00
[58] Field of Search ............. 340/114, 135; 33/264; 46/244 B, 244 D; 180/65 R, 65 A, 65 F; 343/225; 318/16

[56] References Cited
UNITED STATES PATENTS
3,573,867  4/1971  Mehrens........................... 46/244 B
3,727,228  4/1973  Taylor............................. 340/114 X Primary Examiner—Donald J. Yusko
Attorney, Agent, or Firm—Fleit & Jacobson

[57] ABSTRACT

The invention relates to a self-propelled movable direction marker device for guiding the path of a machine movable relative thereto, the device comprising a body provided with means enabling it to be moved over the ground, a marker or indicator carried on said body on which a sighting or bearing can be taken from the machine, a motor driven transmission for driving said means, a device for sensing the distance the marker device is moved by the motor driven transmission, means for cutting out the drive to said means when the marker device has been moved a predetermined distance and means which can be actuated by or from the machine for re-starting the drive.

19 Claims, 6 Drawing Figures 3,860,906

SELF-PROPELLED DIRECTION MARKER

BACKGROUND OF THE INVENTION

It is often necessary to guide a machine, such as an agricultural machine, along straight parallel paths and to provide markers on which to take a sighting or bearing so that the machine can be guided along the correct path. For example, when spraying crops with a fertilizer, herbicide or pesticide it is essential that the spraying device is moved along parallel paths that do not overlap as this not only results in a wastage of the sprayed material but can lead to damage of the crop and pollution of the land. Certain herbicates have been developed which can not be used unless great accuracy is obtained in applying them to the crop.

Hitherto it has been necessary to set up manually a number of guide markers across a field or to re-position manually a guide marker after each traverse of the crop by the machine and this is costly as far as time and labour is concerned.

SUMMARY OF THE INVENTION

The invention relates generally as indicated to a self-propelled movable direction marker device for guiding the path of a machine movable relative thereto. An object of the invention is to provide such a marker device which automatically moves from one position to another desired position.

Another object is to provide a marker device which is relatively simple in construction and therefore cheap to manufacture.

A further object is to provide a marker device in which the distance it moves between static positions can be pre-set and adjusted.

According to the present invention there is provided a self-propelled movable direction marker device for guiding the path of a machine movable relative thereto, comprising a body provided with means enabling it to be moved over the ground, an indicator means carried on said body on which a sighting can be taken from said machine movable relative thereto, a motor driven transmission means for driving said first means, sensor means for sensing the distance the marker device is moved by said motor driven transmission means, means for cutting out the drive to said first mentioned means when the marker device has been moved a predetermined distance and means for re-starting the drive when the machine has moved along the guided path.

Preferably the body is supported on wheels and the device for sensing the distance the marker device is moved comprises a counter device which counts the revolutions or part revolutions of the wheels. The periphery of each wheel may measure a yard or metre or a proportion of a yard or metre so that the predetermined distance can be calculated in yards or metres.

The counter device may be of a type in which a predetermined number of units to be counted can be set and the counter when operated counts back to zero to actuate the means for cutting out the drive, the counter then being re-settable back to the predetermined number of units, or it may be of a type in which it counts from zero up to the set number of units and then actuates the means for cutting out the drive, the counter then being set back to zero.

Preferably the motor consists of an electric motor controlled by a switch operated by the counter device.

The counter can be re-set by a micro-switch operated by a movable arm arranged to be moved by the device movable relative to the marker device or alternatively by remote control means.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail certain illustrative embodiments of the invention, these being indicative however, of but ways in which the principle of the invention may be employed.

In said annexed drawings.

DESCRIPTION OF THE PREFERRED EMBODIMENTS

Figure 1:
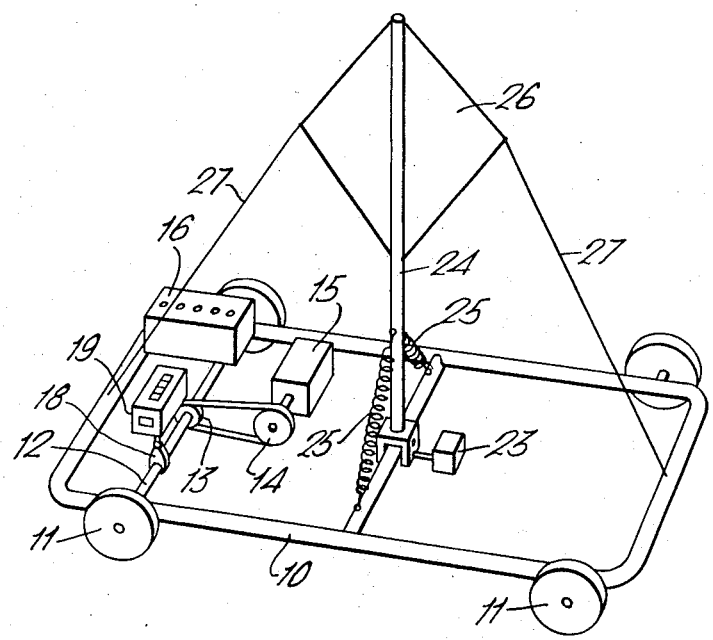
FIG. 1 is a diagrammatic perspective view of a first embodiment of a self-propelled movable marker device according to the invention.
Figure 2:
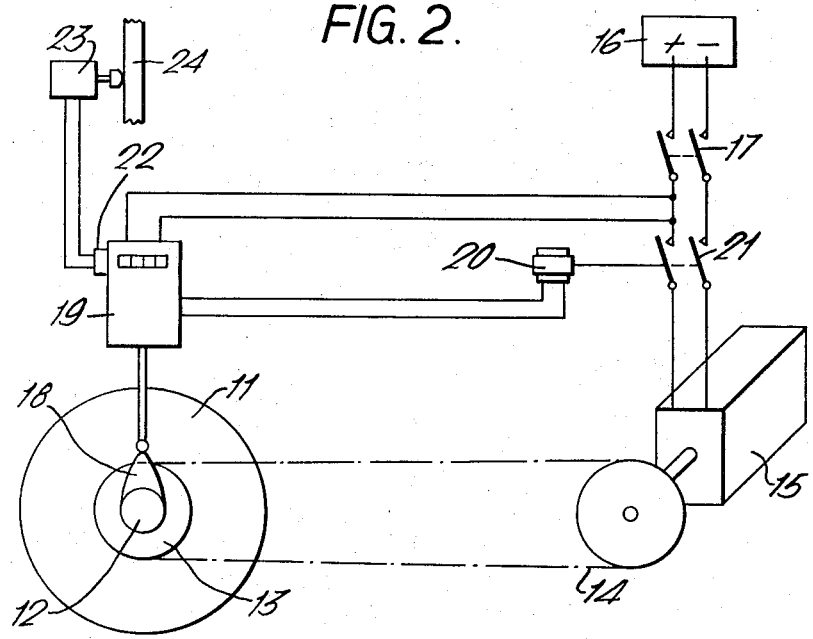
FIG. 2 is a circuit diagram of the first embodiment.
Figure 3:
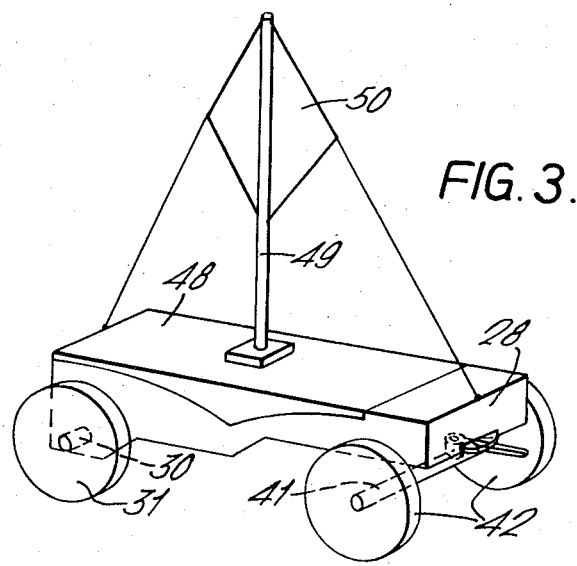
FIG. 3 is a diagrammatic perspective view of a second embodiment of a self-propelled movable marker device.
Figure 4:
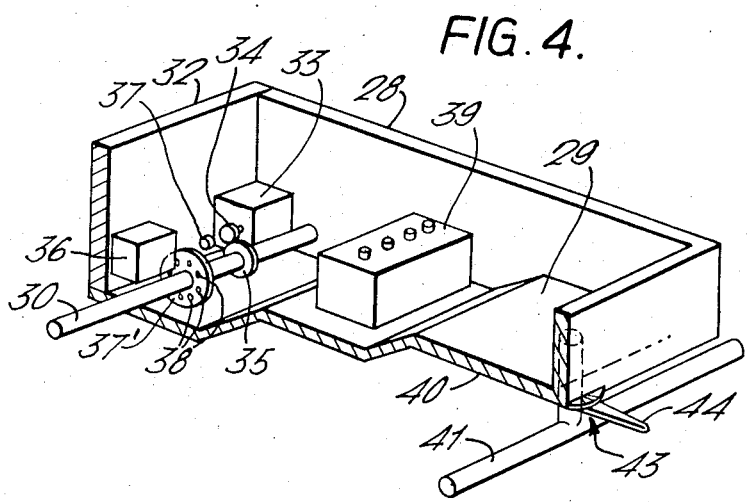
FIG. 4 is a diagrammatic perspective sectional view of the body portion of the marker device of FIG. 3.
Figure 5:
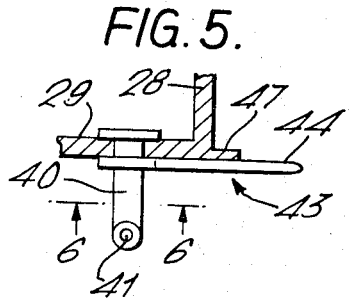
FIG. 5 is a sectional view of the mounting for the steerable wheels of the embodiment shown in FIGS. 3 and 4.
Figure 6:
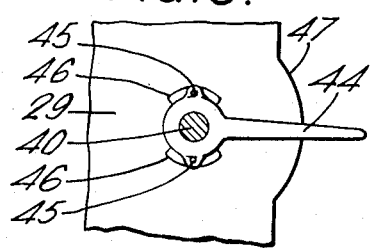
FIG. 6 is a view taken in the direction of line 6—6 indicated on FIG. 5.

The self-propelled direction marker device shown in FIG. 1 has a tubular chassis or body 10 supported on wheels 11. One pair of wheels 11 are mounted on a shaft 12 provided with a sprocket or pulley 13 of a chain or belt drive transmission 14 driven by an electric motor 15. Alternatively the transmission 14 may comprise a gear set. The motor 15 receives electric current from a 12 volt battery 16 via a main cut-out switch 17. Provided on the shaft 12 is a cam 18 which transmits one or a predetermined number impulses per complete revolution of the wheels 11 to an electric or mechanical counter 19 connected in an electric circuit to an electrically operated switch 21 in the circuit to the electric motor 15. The switch 21 may be operated by a solenoid or relay 20 as shown or by other means.

The counter 19 can be set to respond to a predetermined number of impulses and this set predetermined number can be adjusted. The counter 19 may count back to zero. For example, 10 units can be set in the counter 19 and when 10 impulses have been fed to the counter 19 by the cam 18 the setting will be zero and at zero setting the counter 19 will actuate the solenoid or relay 20 to open the switch 21 thereby cutting out the motor 15 and thus the drive to the wheels 11. It is possible for the wheels 12 to be braked at this time to prevent the marker device overrunning its intended position. Alternatively the counter 19 may count from zero upwards, i.e., 10 units may be set in the counter and when 10 impulses have been counted the counter 19 will actuate the solenoid or relay so to open the switch 21.

The counter 19 is provided with a re-set device 22 operated by a micro-switch 23 actuated by movement of a mast 24 which is hinged to the chassis 10. The mast 24 is acted upon by springs 25 to keep it normally in a vertical position. Fastened to the mast 24 is a marker 26 formed of flexible material which is tensioned by lines 27. It is possible for the mechanism to be operated mechanically.

The wheels 11 have a peripheral dimension of one yard or alternatively one metre and therefore each impulse transmitted by the cam 18 will correspond to one yard or metre of movement of the marker device.

The marker device is set up so as to be moved across the path of movement of the equipment in use, for example a tractor drawn crop spraying device and is preferably located mid-way along the length of said path. The tractor driver lines up with the marker 26 and commences to move along the path. The counter 19 will have been pre-set to respond after a predetermined number of impulses have been counted. When the equipment such as a tractor drawn crop spraying device reaches the marker device part of the equipment, such as a spray boom, will strike the mast 24 causing it to pivot about its hinge against the force of one of the springs 25. The movement of the mast 24 will actuate the micro-switch 23 to operate the re-set device 22 which re-sets the counter 19 from zero to the predetermined number of impulses, the solenoid 20 will be energised and the switch 21 closed, switch 17 having already been closed. The mast 24 will be restored by the springs 25 to its vertical position and micro-switch 23 opened. After the spray boom has passed, the motor 15 will be operated to drive the wheels 11 via the drive transmission 14. At each complete revolution of the wheels 11 an impulse will be transmitted by the cam 18 to the counter 19. When the counter reaches zero the solenoid or relay 20 will open the switch 21 to cut out the motor 15 and the marker device will come to rest in its new predetermined position. The equipment is now lined up with the newly positioned marker device and commences its return run. This procedure is repeated until all of the crop has been dealt with.

The wheels 11 can be replaced by an endless track laying device. Instead of having a movable mast 24 the re-set device 22 of the counter 19 may be operated by a radio or audio or light signal transmitted from the equipment. The visual marker 26 may be replaced by, or incorporate, a transmitter for emitting a visual or audio or radio signal picked up by a receiver on the crop spraying machine and used as a homing device to guide the machine along the desired path.

The embodiment shown in FIGS. 3 to 6 comprises a box-like body 28 which may be formed of plastics material such as glass fibre reinforced plastics material. The body 28 has a base 29 which is stepped. Supported in the body 28 at one end thereof is a shaft 30 on which are mounted wheels 31. Secured to one end of the body 28 is a detachable end plate 32 on which is mounted an electric motor 33 having a drive pinion 34 which engages with a gear 35 provided on the shaft 30. Also mounted on the plate 32 is an electronic counter 36 which incorporates a radio signal receiver. A light source 37 is mounted on the plate 32 which directs a beam of light towards the counter 36. Mounted on the shaft 30 is a disc 37' provided with a plurality of circumferentially spaced apart apertures 38. The disc 37' is located between the light source 37 and the counter 36 with the pitch circle of the apertures 38 located on the line of the beam of light from the light source 37. The counter 36 will include resettable contacts (not shown) operated by a radio controlled servo system.

Mounted on a central platform formed by the stepped base 29 is a battery 39 which provides electric power for driving the motor 33 and counter 36.

At the other end of the body 28 there is rotatably mounted on the base 29 a vertical shaft 40 to the lower end of which is secured a tube 41. Mounted on the ends of the tube 41 are wheels 42. The shaft 40 is provided with a pointer device 43 having a pointer 44 and extending from the device 43 are bolts 45 which extend through arcuate slots 46 provided in the base 29. Provided on the body 28 is a quadrant 47 provided with indication lines. The pointer 44 cooperates with the quadrant 47. With the bolts 45 slackened the shaft 40 can be rotated so as to alter the direction of the wheels 42. When the wheels 42 have been set to the desired position the bolts 45 are re-tightened to hold the shaft 40 fast. This enables the wheels 42 to be set at an angle if the marker device is to traverse along a slope.

Mounted on the body 28 is a lid 48 which is hinged at one end to the body 28 and which can be swung upwardly about the hinge to give access to the interior of the body 28. Mounted on the lid 48 is a mast 49 which serves as an aeriel for receiving radio signals from a transmitter carried on the equipment which is movable relative to the marker device. Attached to the mast 49 is a visual indicator 50.

The plate 32 can be removed together with the motor 33, counter 36 and light source 37 which are attached thereto.

In use of the marker device shown in FIGS. 3 to 6, the device is positioned to move along a line which is normal to the path of the equipment. The driver of the equipment will drive the equipment towards the marker device directed by visual sighting of the indicator 50. As the equipment approaches the marker device a radio signal will be picked up by the mast 49 and conveyed to the counter 36. The radio controlled servo system in the receiver of the counter 36 will actuate a relay and the motor 33 will be energised. A predetermined number of units to be counted will have been set in the counter 36. The motor 33 via the gears 34 and 35 will rotate the shaft 30 causing the marker device to be moved forwardly. As each aperture 38 in the disc 37' passes across the beam of light from the light source 37 it will allow light to pass to the counter 36. After the predetermined number of light impulses have been counted by the counter, which will correspond to a given linear movement of the marker device, the counter will operate a relay to cut out the motor 33 and bring the marker device to rest when the equipment again approaches the marker device the radio signal transmitted will re-set the counter to zero which will actuate the relay to restart the motor.

The counter 36 is preferably provided with means whereby it can be altered to count units representative of metres instead of feet.

It is possible to use the self-propelled direction marker devices when spraying crops from an aircraft.

The transmission arrangement may be such that the motor runs continuously and the drive is cut out by a clutch device operated by a solenoid relay.

The self-propelled direction marker may be used with machines other than crop spraying machines. For example, it can be used to guide any agricultural machine across a field, such as a trench digging machine. It can be used to guide automatically controlled agricultural machines.

Other modes of applying the principle of the invention may be employed, change being made as regards the details described, provided the features stated in any of the following claims, or the equivalent of such be employed.

I, therefore, particularly point out and distinctly claim as my invention:

1. A self-propelled movable direction marker device for guiding the path of a machine movable relative thereto, comprising a body provided with means enabling it to be moved over the ground, an indicator means carried on said body on which a sighting can be taken from said machine movable relative thereto, a motor driven transmission means for driving said first means, sensor means for sensing the distance the marker device is moved by said motor driven transmission means, means for cutting out the drive to said first mentioned means when the marker device has been moved a predetermined distance, and means for re-starting the drive when the machine has moved along the guided path, wherein said sensor means comprises a counter device for counting revolutions of a shaft of the transmission means, said counter being resettable by means operated by a radio signal emitted from the machine movable relative to the marker device.

2. A self-propelled movable direction marker device for guiding the path of a machine movable relative thereto, comprising a body provided with means enabling it to be moved over the ground, an indicator means carried on said body on which a sighting can be taken from said machine movable relative thereto, a motor driven transmission means for driving said first means, sensor means for sensing the distance the marker device is moved by said motor driven transmission means, means for cutting out the drive to said first mentioned means when the marker device has been moved a predetermined distance, and means for re-starting the drive when the machine has moved along the guided path, wherein the first mentioned means comprise wheels on said body, and said sensor means for sensing the distance the marker device is moved comprises a counter device for counting the revolutions or part revolutions of the wheels.

3. A marker device as set forth in claim 2, wherein said sensor means comprises a counter device of a type in which a predetermined number of units to be counted can be set and the counter when operated counts back to zero to actuate said means for cutting out the drive, means being provided to re-set the counter back to the predetermined number of units.

4. A marker device as set forth in claim 2, wherein said sensor means comprises a counter device of a type in which a predetermined number of units to be counted can be set and the counter when operated counts from zero up to said predetermined number to actuate said means for cutting out the drive, means being provided to re-set the counter back to zero.

5. A marker device as set forth in claim 2, wherein said sensor means comprises a mechanically operated counter device.

6. A marker device as set forth in claim 2, wherein said sensor means comprises an electrically operated counter device.

7. A marker device as set forth in claim 2, wherein said sensor means comprises a mechanically operated counter device for counting impulses produced by a cam means rotatable with a drive shaft forming part of said transmission means.

8. A marker device as set forth in claim 2, wherein said sensor means comprises an electrically operated counter device for counting light impulses produced by light passing through apertures provided in a disc rotatable by said transmission means.

9. A marker device as set forth in claim 2, wherein said motor driven transmission means includes an electric motor controlled by means operated by the sensor means.

10. A marker device as set forth in claim 2, wherein said motor driven transmission means comprises an electric motor having an output shaft, a pulley mounted on said shaft, a shaft connected to drive wheels mounted on said body, a pulley mounted on said shaft and a belt engaging said pulleys.

11. A marker device as set forth in claim 2, wherein said motor driven transmission means comprises an electric motor having an output shaft, a sprocket mounted on said shaft, a shaft connected to drive wheels mounted on said body, a sprocket mounted on said shaft and a chain engaging said pulleys.

12. A marker device as set forth in claim 2, wherein said motor driven transmission means comprises an electric motor having an output shaft, a gear wheel mounted on said shaft, a shaft connected to drive wheels mounted on said body and a gear mounted on said shaft and in driving connection with the gear provided on the output shaft of said motor.

13. A marker device as set forth in claim 2, wherein said wheels comprise at least one pair being adjustable in direction.

14. A marker device as set forth in claim 2, wherein said body supports a mast, said mast carrying said indicator means.

15. A marker device as set forth in claim 2, wherein said wheels drive endless track devices.

16. A marker device as set forth in claim 2, wherein said motor driven transmission includes a clutch means constituting said means for cutting out the drive, means for operating said clutch means and in which said motor is caused to run continuously whilst the marker device is in use.

17. A marker device as set forth in claim 2, wherein said body consists of a tubular structure.

18. A marker device as set forth in claim 2, wherein said body consists of a box-like structure having a top opening and an end opening, a lid for closing said top opening and a removable cover plate for closing said end opening, said cover plate carrying said motor, said sensing means and said cut out means.

19. A self-propelled movable direction marker device for guiding the path of a machine movable relative thereto, comprising a body provided with means enabling it to be moved over the ground, an indicator means carried on said body on which a sighting can be taken from said machine movable relative thereto, a motor driven transmission means for driving said first means, sensor means for sensing the distance the marker device is moved by said motor driven transmission means, means for cutting out the drive to said first mentioned means when the marker device has been moved a predetermined distance, and means for re-starting the drive when the machine has moved along the guided path, wherein said sensor means comprises a counter device for counting revolutions of a shaft of the transmission means, said counter being resettable by a microswitch which can be operated by a movable arm mounted on said body, said arm being arranged to be moved by being struck by a part of the machine movable relative to the marker device.

* * * * *